(12) United States Patent
Bett et al.

(10) Patent No.: US 11,343,282 B2
(45) Date of Patent: May 24, 2022

(54) STORAGE AND DATA PROTECTION AS A SERVICE IN A CLOUD NATIVE ENVIRONMENT

(71) Applicant: EMC IP Holding Company LLC, Hopkinton, MA (US)

(72) Inventors: Antony Siloiy Bett, Shrewsbury, MA (US); Luay Alem, Lynnfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 411 days.

(21) Appl. No.: 16/657,842

(22) Filed: Oct. 18, 2019

(65) Prior Publication Data

US 2021/0120039 A1    Apr. 22, 2021

(51) Int. Cl.
*G06F 11/14* (2006.01)
*H04L 29/06* (2006.01)
*G06Q 30/02* (2012.01)

(52) U.S. Cl.
CPC .......... *H04L 63/20* (2013.01); *G06F 11/1451* (2013.01); *G06Q 30/0277* (2013.01); *G06F 2201/84* (2013.01)

(58) Field of Classification Search
None
See application file for complete search history.

(56) References Cited

U.S. PATENT DOCUMENTS

| 2015/0142747 | A1* | 5/2015 | Zou | G06F 11/1407 |
| | | | | 707/649 |
| 2017/0220427 | A1* | 8/2017 | Fu | G06F 3/06 |
| 2020/0348938 | A1* | 11/2020 | Mark | G06F 3/065 |

* cited by examiner

*Primary Examiner* — Cai Y Chen
(74) *Attorney, Agent, or Firm* — Stanford Tomita LLP (57) ABSTRACT

Classes of storage are associated with data protection policies. The storage classes are mapped to storage providers and the storage providers are connected to a backup storage server. A service broker advertises to stateful workloads in a cloud native environment a service catalog listing the storage classes. The service broker receives a request from a stateful workload for a class of storage. A storage provider having storage of the storage class is instructed to provision a volume. A response to the request includes an identification of the volume to allow the stateful workload to persist data on the volume. The storage provider is instructed to generate snapshots of the volume according to a data protection policy associated with the storage class. Backups of the snapshots to the backup storage server are conducted according to the data protection policy.

18 Claims, 7 Drawing Sheets

STORAGE AND DATA PROTECTION AS A SERVICE IN A CLOUD NATIVE ENVIRONMENT

TECHNICAL FIELD

The present invention relates generally to information processing systems, and more particularly to providing storage and data protection as a service in a cloud native environment.

BACKGROUND

Cloud native computing refers to software developed as microservices running within containers. The containers are run within a virtualized environment and provide for resource isolation, efficient resource utilization, and agility.

Early developments of cloud native applications were stateless applications. A stateless application is an application program that does not save client data. Instead, all user data and session data remain with the client. An example of a stateless application is a frontend application. The application (or container within which the application runs) can be deleted and the application can be started somewhere else and run as it did previously.

There are many other situations, however, where it is necessary to persist data so that the data can be available in another session. An example of a stateful application is a database (e.g., MongoDB®). The need to persist data is generally accompanied by the need to protect the data against inadvertent deletion, hardware failures, corruption, and other disasters.

Persisting and protecting data for a stateful application or workload in a cloud native environment, however, is very difficult, time-consuming, and cumbersome. The reasons for this are many and include the dynamism of a containerized virtual computing environment, short release cycles of modern application development, administrative overhead of a cloud native environment with respect to storage and data protection, and requirements on the application developer to understand low-level details of different storage and data protection systems. Therefore, there is a need for improved systems and techniques to manage and facilitate stateful applications or workloads in a cloud native environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Disclosed herein are methods and systems for utilizing an Open Service Broker (OSB) application programming interface (API) to provide storage and data protection as a service. In a specific embodiment, the Open Service Broker API™ is leveraged to offer a single managed service offering for both storage and data protection for workloads running in a cloud native environment or platform. Systems and techniques are provided to unify storage and data protection as a single coupled service. In a specific embodiment, the Open Service Broker is used to allow a service provider to offer this backing service to workloads running in a cloud native environment in a way that abstracts or obscures the lower level details of available storage and data protection. Storage and data protection can be specified top-down using abstract terms (e.g., gold, silver, or bronze). Thus, application developers (or class operators) are not burdened by implementation details. Instead, the developer merely needs to know how to request storage from the service broker. In a specific embodiment, the cloud native environment is a Kubernetes Environment®.

The Open Service Broker API™ is an industry specification that allows service providers to offer backing services to workloads running on cloud native platforms. A detailed discussion of the Open Service Broker API is provided in the Open Service Broker API specification, which is incorporated by reference along with all other references cited. Service brokers advertise a catalog of service offerings and manage the lifecycles of every instance of a service that it provisions, including providing all the information to an application or a workload that needs to connect to it regardless of how or where the service is running. Most service brokers that exist today are typically used to provision services such as databases, message queuing, cache, or object storage.

There is a need to support stateful production workloads within cloud native platforms, such as Kubernetes®. In a specific embodiment, the open service broker is leveraged to provide a way for organizations to offer a bundled service of storage and data protection as a service to these stateful workloads. This eliminates the need for managing each individually by having a single offering that caters to both storage and data protection needs of these stateful workloads. Some embodiments are described in conjunction with Kubernetes®. Kubernetes® is an open-source container-orchestration system for automating application deployment, scaling, and management. A detailed discussion of the Kubernetes framework is provided in "Kubernetes Documentation" and is incorporated by reference. It should be appreciated that aspects and principles of the systems and techniques described can be applied to other cloud native platforms.

Traditionally, storage and data protection are handled by separate entities. This model is very difficult to apply to a cloud native environment, and especially large-scale deployments where there are numerous workloads running and each of these workloads requires storage and data protection. Data protection may include, for example, data management, backups, volume snapshots, copying snapshots of the data to a durable storage medium for long-term storage and archiving, and meeting compliance requirements. For example, depending on the organization, legal requirements, or both, there may be requirements for making and preserving snapshots, backups, or both for a certain period of time. It would be desirable for systems and techniques that provide for easily and efficiently meeting these compliance requirements in a cloud native environment.

Figure 1:
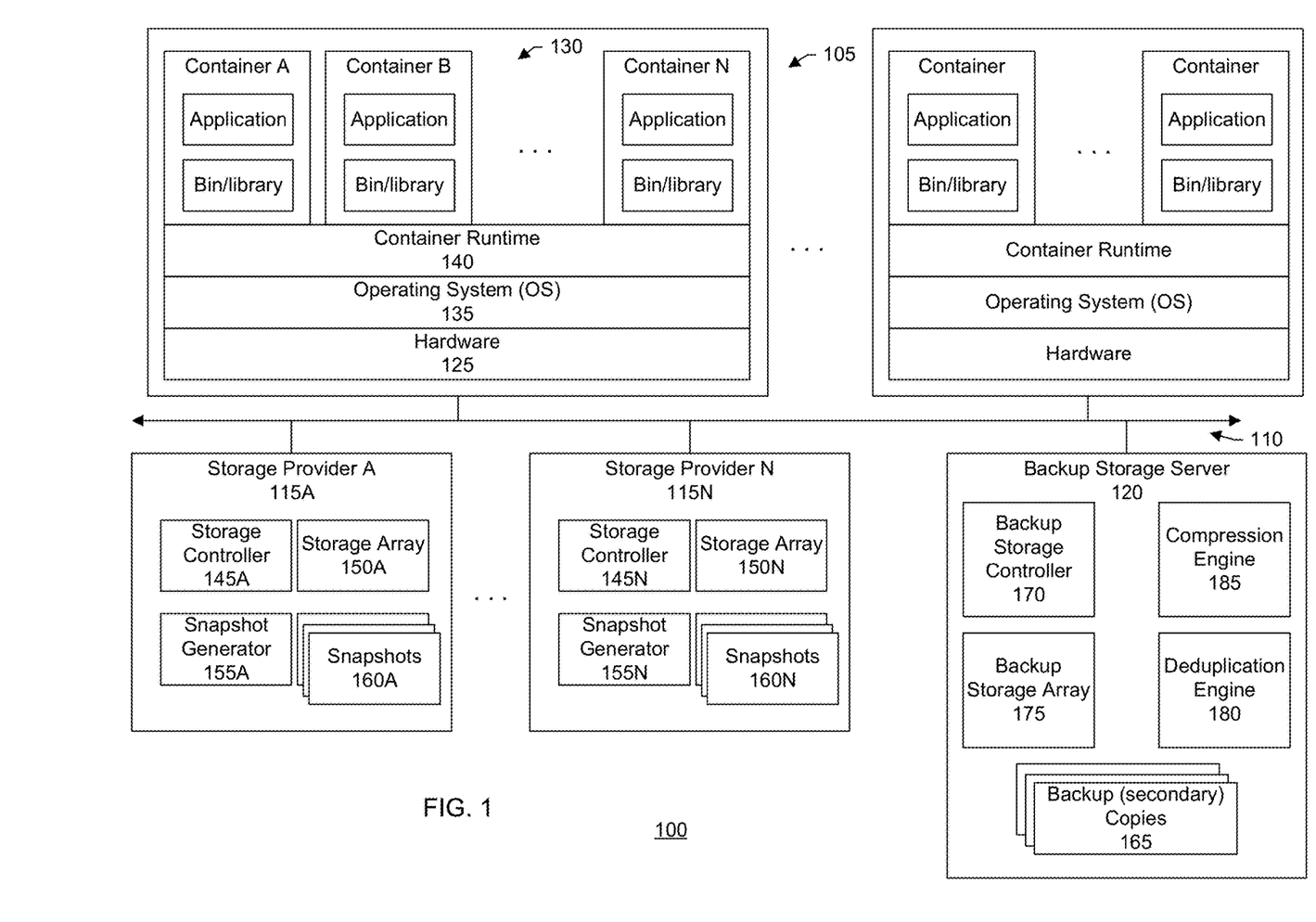
FIG. 1 shows a block diagram of an information processing system for providing storage and data protection as a service in a cloud native environment, according to one or more embodiments.

FIG. 1 shows a block diagram of a cloud native environment information processing system 100 in which storage and data protection may be provided as a service. The example shown in FIG. 1 includes a node 105 connected via a network 110 to any number of storage providers 115A-N and a backup storage server 120.

The network may include a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The node includes a hardware platform 125 hosting containers 130 in which applications, workloads, services, micro-services, processes, or other collections of executable code are deployed. Between the hardware platform and container layer is an operating system (OS) layer 135 and a container runtime layer 140 above the operating system layer. The operating system manages the hardware components and provides an interface to the components via corresponding hardware drivers. The container runtime is responsible for managing and running the containers. A container can have its own filesystem, CPU, memory, and process space, but the containers share the same operating system among the applications running in the containers. The sharing of the operating system helps to keep the containers lightweight and decrease boot times. The decoupling of the containers from the underlying infrastructure allows them to be portable across clouds and OS distributions. The containers can also be easily scaled up or down based on demand.

A cloud native platform, such as Kubernetes, can help provide: 1) service discovery and load balancing including exposing a container using the domain name service (DNS) name or using their own internet protocol (IP) address, and if traffic to a container is high, load balance and distribute the network traffic so that the deployment is stable; 2) storage orchestration including facilitating mounting of a storage system such as local storage or cloud storage; 3) automated rollouts and rollbacks including automated container creation for a deployment and removal of existing containers; 4) automatic bin packing including user-configurable specification of CPU and memory (RAM) each container needs; 5) self-healing including restarting containers that fail, replacing containers, killing containers that do not respond to user-defined health check, and withholding advertising to clients until they are ready to serve; and 6) secret and configuration management including storage and management of sensitive information, such as passwords, OAuth tokens, and ssh keys.

The storage providers provide persistent storage to the stateful workloads or applications running in the containers. In a specific embodiment, the storage providers provide primary storage to the stateful workloads. A storage provider, such as a storage provider 115A may include a storage controller 145A, storage array 150A, and snapshot generator 155A. The storage array may include a set of hard drives (HDD), solid state drives (SSD) or flash storage, other types of storage mediums, or combinations of these.

The storage controller is responsible for overall operation and management including, for example, abstracting one or more drives of the array into a logical unit number (LUN) and presenting an interface through which commands and requests can be received and responded to. In a specific embodiment, each storage provider exposes a REpresentational State Transfer (REST) API interface. A REST API defines a set of functions which applications can use to perform requests and receive responses via HTTP protocol such as GET and POST.

The snapshot generator, upon request, is responsible for generating snapshots 160A of a volume storing data from the stateful workloads. These snapshots may be maintained, reside, or remain at the storage provider for a particular period of time. Each storage provider may have its own native snapshot generator. A snapshot is a virtual copy of data having pointers or references to the actual data, rather than a physical copy. Thus, snapshots can be created very quickly. There are many different types of snapshot techniques such as a copy-on-write, redirect-on-write, clone or split-mirror, copy-on-write (COW) with background copy, incremental, continuous data protection (CDP), and others.

In a specific embodiment, the different storage providers provide different types, levels, categories, or classes of storage. More specifically, the different classes of storage can address different user needs regarding performance, sequential I/O performance, random I/O performance, cost, capacity, expected usage, availability, reliability, endurance, and other criteria.

For example, solid state or flash drives can offer better I/O performance as compared to hard disk drives. Hard disk drives, however, can be less expensive than solid state drives with respect to cost per gigabyte (GB) of storage. Thus, depending on the application, a developer may desire high performance storage in which case a storage provider having flash storage may be selected. Alternatively, there may be a greater desire for capacity and lower costs in which case a storage provider having hard disk drives may be selected. Some examples of storage providers include Dell EMC PowerMax, Dell EMC XtremIO, Dell EMC Unity XT, and Dell EMC PowerVault, as provided by Dell EMC of Hopkinton, Mass.

In a specific embodiment, the backup storage server provides secondary storage. In other words, the backup storage server may store backup copies 165 of data stored in the primary storage provided by the storage providers. The backup storage server is separate or different from the storage providers. For example, the backup storage server may include a disk array and controller separate from the disk arrays and controllers of the storage provider. Thus, if a storage provider happens to suffer a disk failure, data can be recovered from the backup storage server. Depending upon the needs of the organization (and particular application or workload), it may be sufficient that the snapshots reside on the primary storage of the storage provider. In other cases, however, it will be desirable to have the data written to a secondary storage system in case the primary storage system or storage provider suffers a failure.

More particularly, in a specific embodiment, the backup storage server includes a backup storage controller 170, backup storage array 175, deduplication engine 180, and compression engine 185 for efficient storage of backup data. An example of a backup storage server is Data Domain as provided by Dell EMC. The storage providers, backup storage server or both may be on-premises or local to the node. Instead or additionally, one or more storage providers, the backup storage server, or both may be remote to the node. For example, the one or more storage providers and backup storage server may be located in different data centers, geographical locations, cloud sites, or combinations of these. The one or more storage providers may be in a first geographical location (e.g., Boston) and the backup storage server may be in a second geographical location, different from the first geographical location (e.g., Philadelphia). The backup storage server may be provided as a virtual machine or physical appliance. The backup storage server may be run on-premises or in a cloud as a virtual machine.

Figure 2:
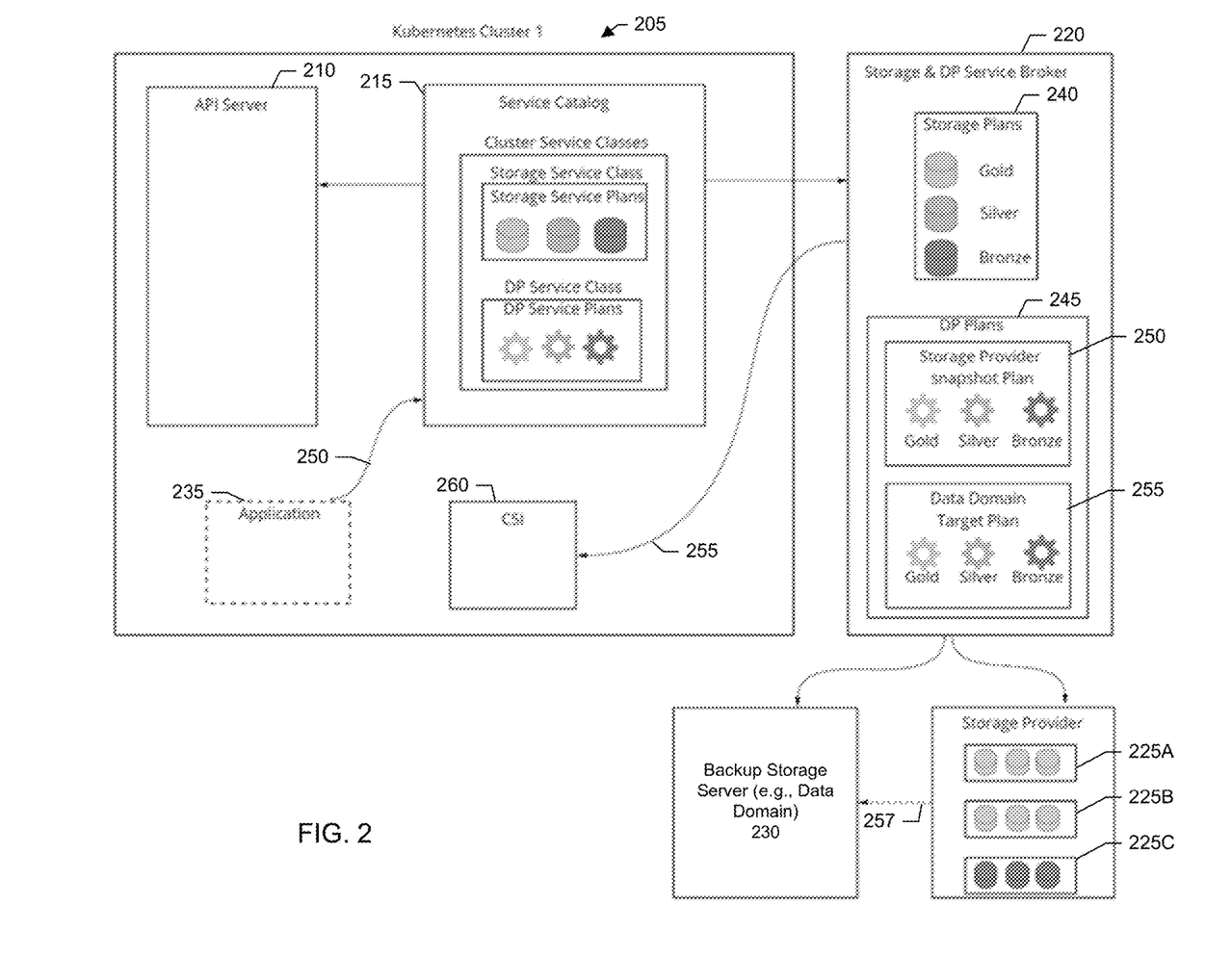
FIG. 2 shows a block diagram of components for the storage and data protection service, according to one or more embodiments.

FIG. 2 shows a block diagram for a bundled storage and data protection service in a cloud native environment. In the example shown in FIG. 2, there is a Kubernetes cluster 205, API server 210, service catalog 215, storage and data protection service broker 220, storage providers 225A-C, a backup storage server 230, and an application 235. The application requires persistent storage (e.g., is a stateful application or stateful workload).

As discussed, in a specific embodiment, the storage and data protection service is based on the Open Service Broker API. That is, the storage and data protection service broker may be built to the Open Service Broker API specification. The Open Service Broker API is an open standard for provisioning an instance of a service, communicating with a service instance (e.g., binding service instances to applications or containers), and deprovisioning service instances (e.g., deleting all resources created upon the initial provisioning of the service instance). The service broker is responsible for providing the information to the container (or stateful workload or stateful application) needed for a connection to the service instance.

Specifically, the Open Service Broker API defines a hypertext transfer protocol (secure) (HTTP(S)) interface between platforms and service brokers. The service broker is the component of the service that implements the service broker API, for which a platform is a client. Service brokers are responsible for advertising a catalog of service offerings and service plans to the platform, and acting on requests from the platform for provisioning, binding, unbinding, and deprovisioning.

In general, provisioning reserves a resource on a service; this reserved resource may be referred to as a service instance. What a service instance represents can vary by service. Examples include a single database on a multi-tenant server, a dedicated cluster, or an account on a web application.

What a service binding represents may also vary by service. In general, creation of a service binding either generates credentials necessary for accessing the resource or provides the service instance with information for a configuration change.

A service catalog is an extension API that enables applications running in Kubernetes clusters to easily use external managed software offerings, such as a datastore service offered by a cloud provider.

The service catalog provides a way to list, provision, and bind with external managed services from service brokers without needing detailed knowledge about how those services are created or managed.

Using the service catalog, a cluster operator can browse the list of managed services offered by a service broker, provision an instance of a managed service, and bind with it to make it available to an application in the Kubernetes cluster.

A stateful application or stateful workload is a collection of executable code that requires backing storage and state to be kept in order to properly run. That is, a stateful application consumes persistent storage. Stateful workloads are made of applications where application data exceeds the life cycle of a container. If a container is created and destroyed, data generated by the application needs to persist and be reused by other containers. Examples of stateful applications or workloads include databases or key-value stores running in a container. Specifically, databases such as Cassandra, MongoDB, Postgres, and MySQL require persistent storage.

A problem with stateful workloads in cloud native environments include separate management systems for storage and data protection. Typically, the storage management system is different from the data protection system, the storage manager usually deals with the life cycle of the storage (e.g., disks, provisioning storage, resizing, and the like). On the other hand, data protection systems deal with policies and plans that control recovery time objectives (RTO) and recovery point objectives (RPO) of protected assets.

Another problem is the complexity in dealing with multiple storage providers. Having more than one storage provider means not having a centralized view of available storage services. Having multiple interfaces to deal with when managing storage adds complexity and overhead for the storage administrator and the platform operator.

Another problem is that application developers need to learn about storage and data protection. In a cloud native environment, developers usually handle the end-to-end life cycle of their application. That means developers need to know how to provision and present persistent storage that the application may need. In addition, they will also need to learn how to protect that persistent storage. This is different from traditional environments where developers hand over their application to others who are responsible for the deployment and oversee the data protection needs of the application.

In a specific embodiment, systems and techniques provide a combined self-service approach to storage and data protection that uses a combination of the open service broker, service catalog, and container storage interface (CSI) to provide a bundled storage and data protection managed service as follows:

1) The service broker runs within a cloud native environment (e.g., Kubernetes cluster) and advertises a catalog of storage services, classes, or plans 240. These classes represent different storage categories such as performance, cost, capacity, and other attributes or characteristics. The storage class can define the type of storage that a workload can request. In a specific embodiment, a storage provider having storage with relatively high performance characteristics (e.g., flash storage) is assigned, tiered, or grouped to a gold class of storage. A storage provider having storage with medium performance characteristics is assigned to a sliver class of storage. A storage provider having storage with low performance characteristics is assigned to a bronze class of storage.

Storage classes may be tiered based on any parameter or combination of parameters associated with the storage provider. Examples of parameters include performance, cost, capacity, or combinations of these. While three examples of storage classes are shown, it should be appreciated that there can be any number storage classes. The service broker provides a bridge or coupling between the cloud workload or platform (e.g., Kubernetes) and the underlying storage provider.

2) The storage classes that the service broker offers may be associated with a data protection policy or plan 245 that defines the protection life cycle of that given storage. In a specific embodiment, a data protection policy or plan includes two subcomponents or plans including a storage provider snapshot plan 250 and a backup storage target plan 255.

For example, depending upon the data protection needs of the workload, it may be desirable to generate snapshots of the volume associated with the workload, copy or move the volume snapshot to a separate data protection storage system for long-term archiving, or both. In other words, a particular storage service may be associated with or have an attached data protection service class.

The storage provider snapshot plans define different levels or options for snapshotting. Such options may include a frequency at which snapshots are to be generated, types of snapshot guarantees, number of snapshots that are to be retained, retention periods for snapshots, and other options, or combinations of these. For example, a snapshot plan specifying a relatively high frequency of snapshotting may be assigned to a gold plan. A snapshot plan specifying a medium frequency of snapshotting may be assigned to a silver plan. A snapshot plan specifying a low frequency of snapshotting may be assigned to a bronze plan. There can be a first snapshot plan specifying that snapshots are to be generated at a first frequency (e.g., every 30 minutes). There can be a second snapshot plan specifying that snapshots are to be generated at a second frequency, different from the first frequency (e.g., every hour).

As another example, there can be a first snapshot plan specifying snapshots with high guarantees in which operations (e.g., write operations) against the volume to be snapshotted are temporarily paused while the snapshot is generated. This can help to ensure a highly consistent snapshot, but performance may be impacted due to the pausing of operations. Alternatively, there can be a second snapshot plan specifying snapshots with loose guarantees in which operations against the volume are not paused while the snapshot is generated. This may result in some data not being captured by a particular snapshot at a particular point in time, but allows for relatively little disruption because operations against the volume are allowed to continue.

As another example, there can be a first snapshot plan specifying a first number of snapshots to be retained. There can be a second snapshot plan specifying a second number of snapshots to be retained, different from the first number of snapshots. A snapshot allows a rollback to a particular point in time. Thus, retaining a large number of snapshots allows rollbacks to many different points in time, but can consume a large amount of storage resources.

As another example, there can be a first snapshot shot plan specifying a first retention period for snapshots. There can be a second snapshot plan specifying a second retention period for snapshots, different from the first retention period. Once a retention period has elapsed or expired, a snapshot associated with the retention period may be deleted or otherwise marked for deletion.

The backup storage plans define different levels or options for conducting backups of the snapshots from the storage providers to the backup storage server. Such options may include a frequency at which backups are to be conducted, the type of backup storage medium onto which the backups are to be stored, retention periods for the backups, type of backup to perform (e.g., full backup, differential backup, or incremental backup), replication options, deduplication options, and other options or combinations of these.

For example, a backup storage plan specifying a relatively high frequency of backups to the backup storage server may be assigned to a gold plan. A backup storage plan specifying a medium frequency of backups to the backup storage server may be assigned to a silver plan. A backup storage plan specifying a low frequency of backups to the backup storage server may be assigned to a bronze plan.

There can be a first backup storage plan specifying that backups are to be performed at a first frequency (e.g., daily). There can be a second backup storage plan specifying that backups are to be performed at a second frequency, different from the first frequency (e.g., weekly). A backup storage plan may specify that certain snapshots are to be backed up while other snapshots are not to be backed up. Criteria that may be evaluated in determining whether a snapshot is to be backed up may include a time or day that a snapshot was generated (e.g., backup only snapshots generated on Tuesday), snapshot size (e.g., backup only snapshots exceeding a predetermined threshold size), and other criteria or combinations of these.

As another example, there can be a first backup storage plan specifying that backups are to be stored on a first type of storage (e.g., high performance or flash storage). There can be a second backup storage plan specifying that backups are to be stored on a second type of storage (e.g., low performance storage). Storing backups on high performance or flash storage can reduce the time required to recover a backup from the backup storage server, but can increase backup storage costs.

3) For each storage class the service broker communicates with the storage provider to provision storage. If the provisioned storage has a data protection policy associated with it, then the service broker uses the storage provider API to perform asynchronous snapshots based on the protection policy. The service catalog interfaces with the service broker. The service broker communicates with each of the different underlying storage providers to provision storage and ensure that the provisioned storage meets or satisfies the storage criteria in the request (e.g., meets storage performance characteristics). If there is a data protection policy attached or otherwise associated with a given storage service request, the service broker handles both the provisioning of the storage and ensuring that the protection lifecycle of the storage is also satisfied.

4) For data protection policies that requires long term retention the service broker orchestrates moving 257 the snapshots from the storage provider to a backup storage server (e.g., Data Domain system) for long term archiving.

5) The service broker advertises its service offerings to the cloud native platform (e.g., Kubernetes cluster) via the service catalog that acts as the intermediary between the Kubernetes API and the service broker API.

6) When a request 250 by application 235 for a service is submitted from the service catalog, the service broker communicates with the storage provider to provision the requested storage, then the service broker pushes 255 that information to CSI 260 to handle mounting the provisioned storage to the Kubernetes cluster. The CSI or container storage interface provides an abstraction of the underlying storage details. The CSI provides a frontend interface that defines how storage providers can provide their storage through a standard interface. The CSI may be implemented by a driver and deployed to the cluster as a container. The service broker interfaces with the CSI to handle the storage operations. For example, mounting of the storage to the cluster so that the storage can be consumed may be performed through the CSI.

In other words, the application requests resources from the cluster. The application may be, for example, a database application (which requires persistent storage), file share, or any other type of application or workload that requires persistent storage. When the service catalog receives a request to provision storage, the service catalog calls the storage and data protection service broker to provision the requested storage.

As discussed, in a specific embodiment, the Open Service Broker API and service catalog is leveraged to offer storage and data protection as a service. In this specific embodiment, the OSB provides a single management plane for storage and data protection, operators can have a centralized view of their storage resources, and corresponding data protection service level agreements (SLAs) as well as centralized visualization of metrics, and other key performance indicators. With the OSB, operators do not have to manually configure storage and data protection independent of each other. The single management plane that OSB offers couples storage and data protection as a single managed service in which the operator does not have to worry about the underlying details of storage and data protection. In addition, multiple Kubernetes clusters can consume storage and data protection services from a single service broker and this paves the way for a centralized data management system.

An application developer does not have to be burdened with knowing or finding out the details of the all the different underlying storage that may be available. Development time is reduced because the application developer does not have to spend time phoning or discussing with a storage administrator the different storage services that are available for consumption—and then, when considering the data protection needs of the application—reaching out to the backup administrator to ensure that the data protection requirements of the organization are met. Through the service catalog, users such as a developer, class operator, or backup administrator are presented with a single interface through which storage and data protection is driven. The users merely need to query the service catalog as the service catalog advertises the list of storage classes and matching data protection classes for each particular class of storage.

Figure 3:
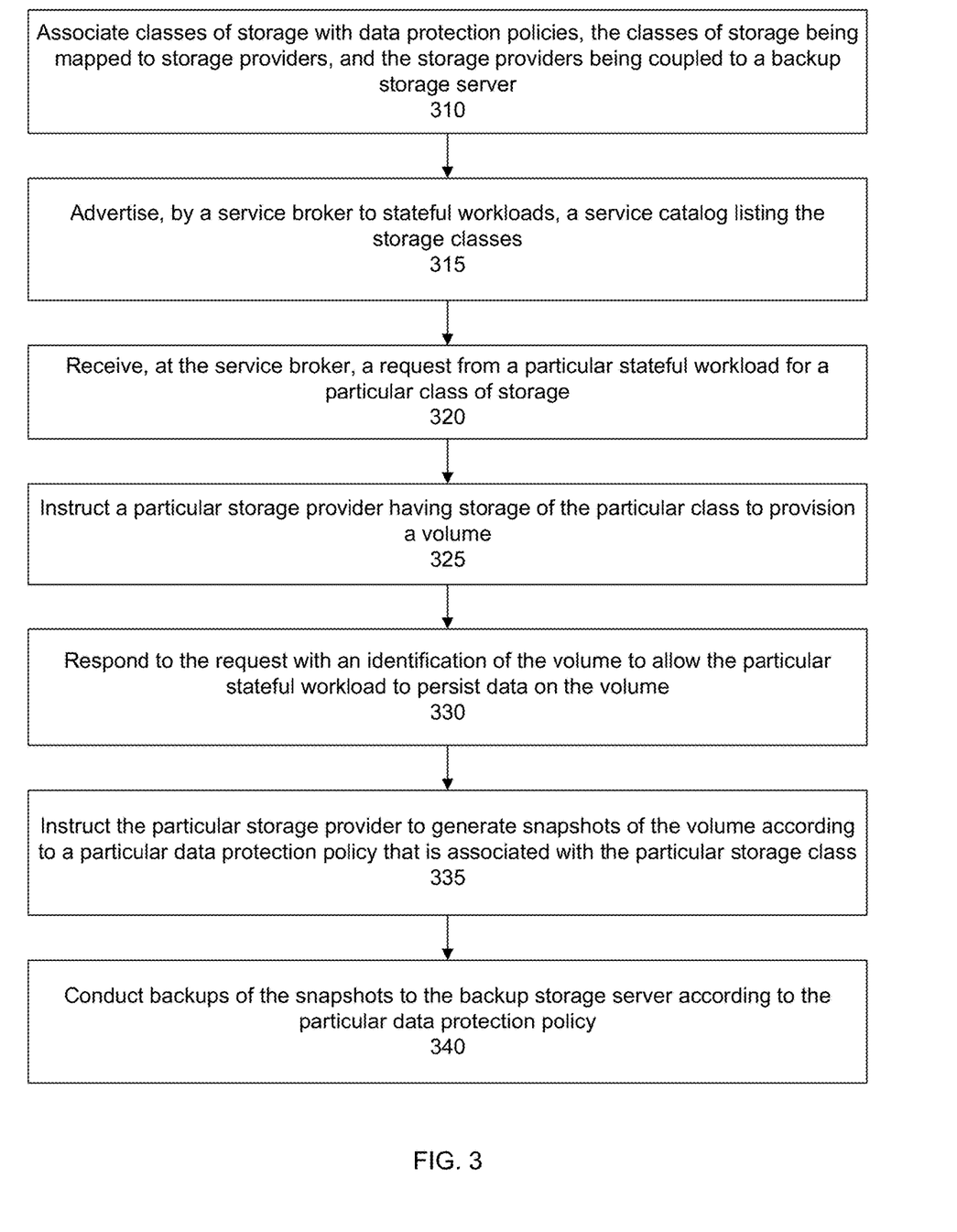
FIG. 3 shows an overall flow for the storage and data protection service in a cloud native environment, according to one or more embodiments.

FIG. 3 shows an overall flow for providing storage and data protection as a service in a cloud native environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, classes of storage are associated with data protection policies, the classes of storage being mapped to storage providers, and the storage providers being connected to a backup storage server, separate from the storage providers. The mapping and associations of storage class to data protection policies may be stored in a table or other competent data structure.

In a specific embodiment, the associations of storage class to data protection policies are preconfigured such as by an administrator. In this specific embodiment, an application developer can simply select a particular storage class for their stateful workload or application. The particular storage class will already have been mapped to a specific storage provider having a particular type of storage characteristic or performance (e.g., HDD or SDD).

Further, the particular storage class will already have been associated with a particular data protection policy. Such a data protection policy may specify, for example, one or more of a frequency at which snapshots are to be generated by the specific storage provider, a frequency at which backups of the snapshots to the backup storage server are to be conducted, snapshot retention period (e.g., duration of time that a snapshot is to be retained at the storage provider), backup retention period (e.g., duration of time that a backup from the snapshot is to be retained at the backup storage server), other data protection operations, or combinations of these. A storage provider may be associated with a single storage class or multiple (e.g., two or more) storage classes.

For example, a first storage class may be mapped to or correspond to a first storage provider. The first storage class may be associated with a first data protection policy. The first data protection policy may specify generating snapshots at a first frequency, and performing backups from the first storage provider to the backup storage server at a second frequency. The second frequency may be different from or the same as the first frequency.

As another example, a second storage class may be mapped to or correspond to a second storage provider. The second storage class may be associated with a second data protection policy. The second data protection policy may specify generating snapshots at a particular frequency, but may not specify performing backups. In other words, stateful workloads or applications using the second storage class are to be snapshotted according to the particular frequency specified in the second data protection policy, but backups to the backup storage server will not be conducted. This data protection policy may be used, for example, with non-critical workloads or applications or for purposes of testing and development.

As another example, third and fourth storage classes may be mapped to or correspond to a same storage provider. Thus, a stateful workload associated with the third storage class and another stateful workload associated with the fourth storage class may both store data on the same type of storage (e.g., flash storage). The third and fourth storage classes, however, may be associated with different data protection policies. That is, the third storage class may be associated with a third data protection policy. The fourth storage class may be associated with a fourth data protection policy, different from the third data protection policy. For example, the third data protection policy may specify generating snapshots, but not backing the snapshots up to the backup storage server for long-term data retention. In other words, snapshots may be maintained at the storage provider, but not backed up to a separate storage system. The fourth data protection policy, however, may specify that at least some of the snapshots are to be backed up from the third storage provider to the backup storage server.

In another specific embodiment, selection of a particular storage class and particular data protection policy may be performed during application deployment.

In a step 315, the service broker advertises to stateful workloads (or applications), a service catalog listing the storage classes.

In a step 320, the service broker receives a request from a particular stateful workload for a particular class of storage.

In a step 325, the service broker instructs a particular storage provider having storage of the particular class to provision a volume.

In a step 330, the service broker responds to the request with an identification of the volume to allow the particular stateful workload to persist data on the volume.

In a step 335, the service broker—according to a particular data protection policy that is associated with the particular storage class—instructs the particular storage provider to generate snapshots of the volume.

In a step 340, the service broker—according to the particular data protection policy that is associated with the particular storage class—conducts backups of the snapshots from the particular storage provider to the backup storage server.

Figure 4:
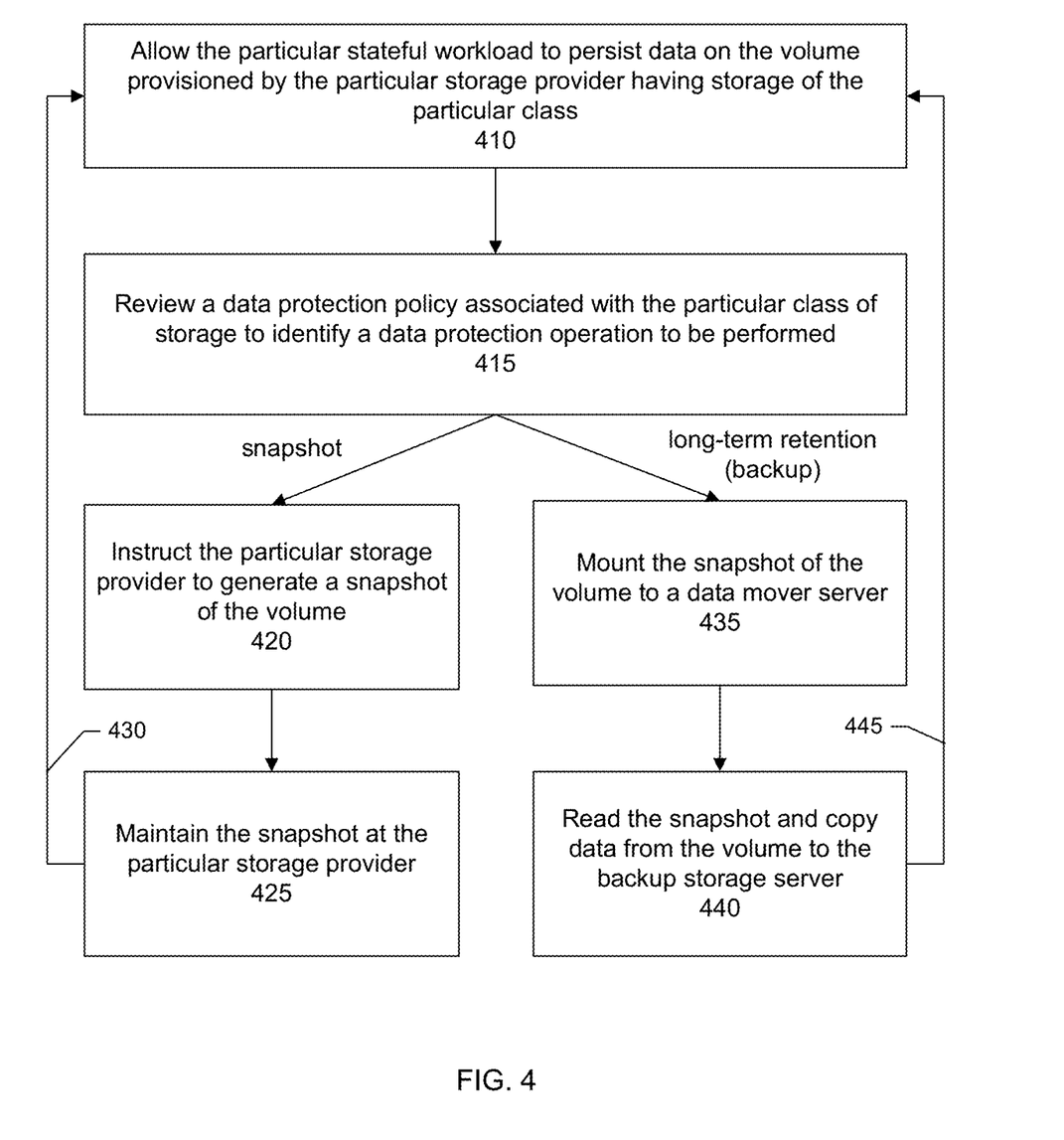
FIG. 4 shows further detail of a flow for data protection operations, according to one or more embodiments.

FIG. 4. further detail of a flow for data protection of a stateful workload or application. In a step 410, the particular stateful workload is allowed to persist data on the volume provisioned by the particular storage provider having storage of the particular class.

In a step 415, the service broker reviews or consults a data protection policy associated with the particular class of storage to identify a data protection operation to be performed. Examples of data protection operations include snapshotting at a storage provider and backing up to a separate backup storage server for long-term retention.

If the data protection policy specifies snapshot, the service broker instructs the particular storage provider to generate a snapshot of the volume (step 420). In a step 425, the snapshot is maintained at the particular storage provider according to the data protection policy. The process then loops back 430 to step 410 where the particular stateful workload continues persisting data to the volume.

If the data protection policy specifies long-term retention (e.g., backup to the backup storage server), the snapshot of the volume is mounted to a data mover server (step 435). In a step 440, the snapshot is read (e.g., pointers dereferenced) and data from the volume is copied from the particular storage provider to the backup storage server.

The data protection policies allow for very fined-grained control of the retention policies of the organization. The data protection policies may specify, for example, a frequency of snapshots, retention period of the snapshots (e.g., duration of time that a snapshot is to remain at the storage provider), a frequency of backups from the snapshots to the backup storage server, retention period of the backups (e.g., duration of time that a backup is to remain at the backup storage server), or combinations of these.

A data protection policy may specify that some snapshots are to be retained for a first period of time while other snapshots are to be retained for a second period of time, different from the first period of time. For example, snapshots generated on Fridays may be retained for 1 year and snapshots generated on days other than Fridays may be retained for 2 months. Thus, a snapshot generated on days other than Friday may be deleted or removed from the storage provider after 2 months has elapsed. A snapshot generated on a Friday may be deleted or removed from the storage provider after 1 year has elapsed. A data protection policy may specify that some backups are to be retained for a third period of time while other backups are to be retained for a fourth period of time, different from the third period of time. These data protection policies can be configurable such as by an administrator of the organization.

Figure 5:
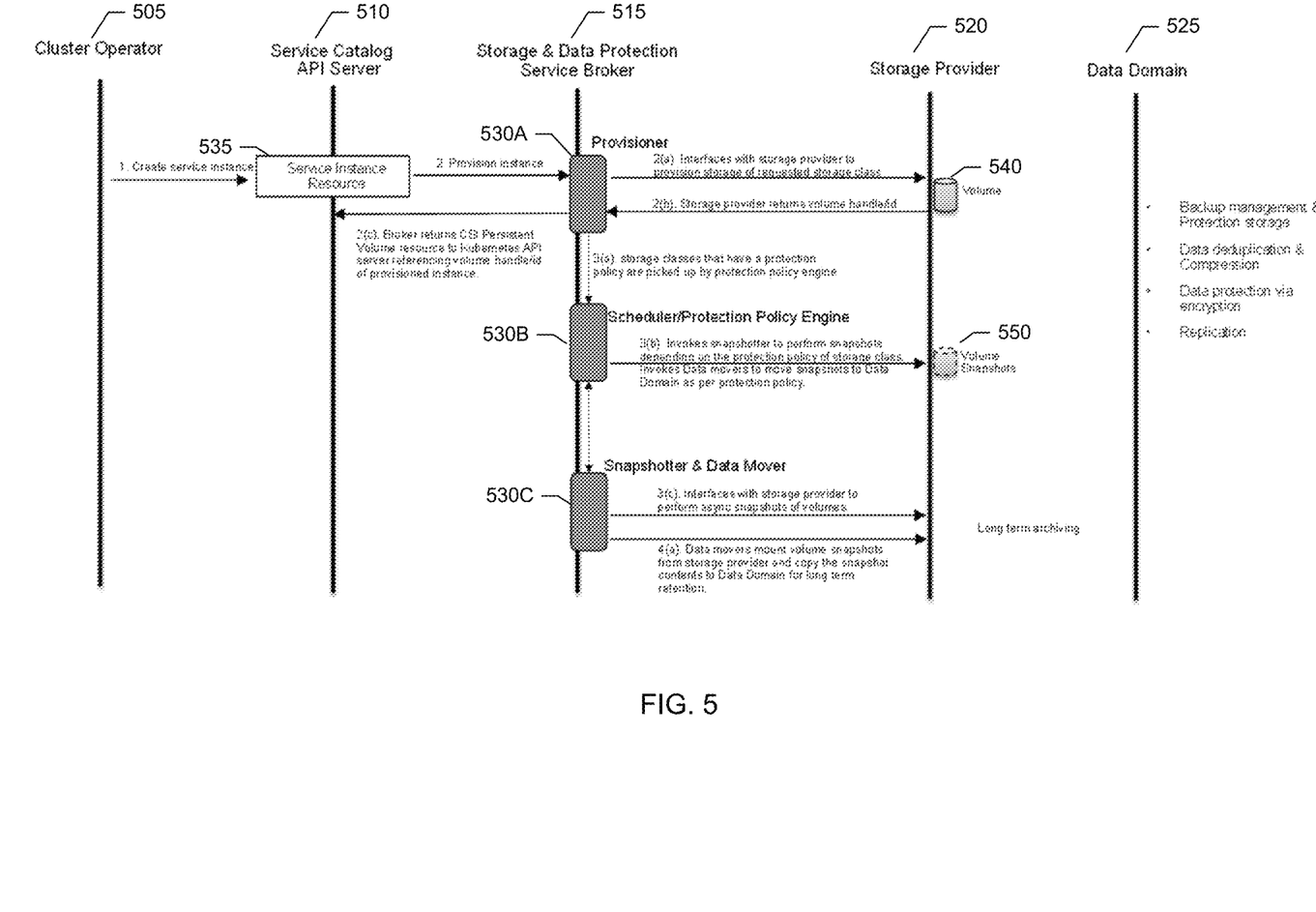
FIG. 5 shows a swimlane diagram of components in the storage and data protection service, according to one or more embodiments.

FIG. 5 shows a swimlane diagram illustrating processes, events, sequences, roles, responsibilities, and components involved in providing storage and data protection as a service. A first swimlane indicates a cluster operator 505, a second swimlane indicates a service catalog API server 510, a third swimlane indicates a storage and data protection service broker 515, a fourth swimlane indicates a storage provider 520, and a fifth swimlane indicates a long-term retention or backup storage system (e.g., Data Domain) 525. The storage and data protection service broker includes several subcomponents including a provisioner 530A, scheduler/data protection policy engine 530B, and snapshotter and data mover 530C.

As shown in the example, in FIG. 5, in a step 1, the cluster operator creates a service instance using the service catalog API server which results in a new service instance resource 535 being created. The service instance makes a specific instance of a managed service available for use by one or more in-cluster applications (e.g., a stateful workload or application).

In a step 2, the service catalog connects to the storage and data protection service broker and instructs it to provision the service instance. In a step 2(a), the storage and data protection service broker (or provisioner) interfaces with the storage provider to provision storage of a requested storage class. The storage provider, in response to the request, provisions a volume 540. In a step 2(b), the storage provider returns to the service broker an identification of the volume (e.g., volume handle/ID).

As discussed, storage classes may be associated with or mapped to data protection policies. Thus, in a step 3(a) storage classes that have a protection policy are picked up by the scheduler/protection policy engine of the service broker. In an embodiment, the protection policy engine may scan the storage classes to identify data protection policies that may be attached or associated with the storage classes.

In a step 3(b), the service broker (or scheduler/protection policy engine) invokes the snapshotter to perform snapshots 550 depending on the protection policy of the storage class. The service broker may additionally invoke one or more data movers to move or copy the snapshots to the backup storage server (e.g., Data Domain) as per the protection policy.

More particularly, in a step 3(c), the service broker (or snapshotter and data mover) interfaces with the storage provider to perform asynchronous snapshots of volumes. In a step 4(a), the data movers mount the volume snapshots from the storage provider and copy the snapshot contents to the backup storage server (e.g., Data Domain) for long-term retention or archiving. The backup storage server can provide backup management and protection storage, data deduplication and compression, data protection via encryption, and replication (e.g., replicating from the backup storage system to another different or separate backup storage system), or combinations of these.

In a specific embodiment, the storage and data protection service is implemented as a collection of microservices. "Microservice" refers to a method of developing software applications as a suite of independently deployable, small, modular services in which each service runs a unique process and communicates through a well-defined, lightweight mechanism to serve a particular goal. The microservice application is developed as a collection of services that are independently deployable and scalable. In illustrative embodiments, such a framework may be implemented in a cloud native environment, such as one that executes one or more container clusters, which include features such as scalability, fault-tolerance, extensibility and fast deployment and scheduling. Each service instance may be provided with the appropriate CPU, memory, and I/O resources. The microservice application monitors functional components to detect increases and decreases in activity. When an increase in activity is detected, a number of instances of the microservice can be increased. Conversely, when a decrease in activity is detected, the number of instances of the microservice can be decreased.

More specifically, in a specific embodiment, one or more components of the service broker including the provisioner, snapshotter, data movers, or combinations of these may be deployed as microservices on top of a cloud native platform (e.g., Kubernetes) cluster. As discussed, Kubernetes manages and orchestrates containerized applications. The service broker can be hosted on such as platform with its components—provisioner, snapshotter, and data movers—running in containers (but can also be hosted externally on another platform).

In an embodiment, the service broker tracks the different snapshot schedules and long-term retention backup schedules. When a snapshot schedule indicates that a time for a snapshot has arrived, the service broker can create or direct the creation of a microservice instance of a snapshotter running in a container. The snapshotter can instruct the snapshot generator of the storage provider to generate a snapshot. Similarly, when the backup schedule indicates that a time for a backup to long-term retention storage has arrived, the service broker can create or direct the creation of a microservice instance of a data mover running in a container.

Microservice instances can be scaled up or down based on demand. For example, during periods of low or little activity such as between different snapshot or backup intervals, the corresponding number of microservice instances will also be relatively low. During periods of high activity, however, the number of microservice instances can be scaled up to handle, for example, mounting the various snapshots at the various storage providers to data movers and copying the data from the storage providers via the snapshots to the backup storage server. The ability to dynamically scale up or down helps to provide an efficient use of computer resources and reduce operating the operating costs of the storage and data protection service. There can be different data mover microservices for mounting and backing up each respective volume snapshot from the storage providers to the backup storage servers.

In a specific embodiment, a data mover microservice may be provided at a storage provider and a corresponding data mover microservice may be provided at the backup storage server. When a time for long-term archiving has arrived, a handshake may be initiated and performed between the data mover microservice at the storage provider and the corresponding data mover microservice at the backup storage server. The handshake may include, for example, a negotiation between the two microservices, key exchange, and authentication in order to establish a connection between the storage provider and the backup storage server. As discussed, in a specific embodiment, the backup storage server provides deduplicated storage. In this specific embodiment, a data object at the storage provider may be segmented and fingerprints (e.g., hashes) may be calculated for the segments. The fingerprints may be compared against a fingerprint or deduplication index identifying segments already existing at the backup storage server. A matching fingerprint indicates that the corresponding data segment already exists at the backup storage server. A non-matching fingerprint indicates that the corresponding data segment does not exist at the backup storage server and should be transmitted from the storage provider to the backup storage server. The transmission may further include data compression operations to reduce traffic over the network, encryption operations to secure the data, or both. Deduplication helps to conserve backup storage resources by storing only unique data.

In a specific embodiment, there is a method for providing storage and data protection as a service in a cloud native environment comprising: associating a plurality of classes of storage with a plurality of data protection policies, the plurality of storage classes being mapped to a plurality of storage providers, and the plurality of storage providers being coupled to a backup storage server; advertising, by a service broker to a plurality of stateful workloads in the cloud native environment, a service catalog listing the plurality of storage classes; receiving, at the service broker, a first request from a first stateful workload for a first class of storage; instructing a first storage provider having storage of the first class to provision a first volume; responding to the first request with an identification of the first volume to allow the first stateful workload to persist data on the first volume; instructing the first storage provider to generate first snapshots of the first volume according to a first data protection policy that is associated with the first storage class; and conducting backups of the first snapshots to the backup storage server coupled to the first storage provider according to the first data protection policy.

The method may further include receiving, at the service broker, a second request from a second stateful workload for a second class of storage; instructing a second storage provider having storage of the second class to provision a second volume; responding to the second request with an identification of the second volume to allow the second stateful workload to persist data on the second volume; instructing the second storage provider to generate second snapshots of the second volume according to a second data protection policy that is associated with the second storage class; and not conducting backups of the second snapshots because the second data protection policy does not specify backups to the backup storage server.

In an embodiment, the backup storage server is separate from the plurality of storage providers. In an embodiment, the first data protection policy specifies a first frequency at which the first snapshots are to be generated, and a second frequency, different from the first frequency, at which backups of the first snapshots to the backup storage server are to be conducted.

In an embodiment, the conducting backups includes mounting a snapshot of the first snapshots stored at the first storage provider; and copying data referenced by the snapshot from the first storage provider to the backup storage server.

Each storage provider may expose a representational state transfer (REST) application programming interface (API) through which the plurality of stateful workloads issue requests for storage.

In another specific embodiment, there is a system for providing storage and data protection as a service in a cloud native environment, the system comprising: a processor; and memory configured to store one or more sequences of instructions which, when executed by the processor, cause the processor to carry out the steps of: associating a plurality of classes of storage with a plurality of data protection policies, the plurality of storage classes being mapped to a plurality of storage providers, and the plurality of storage providers being coupled to a backup storage server; advertising, by a service broker to a plurality of stateful workloads in the cloud native environment, a service catalog listing the plurality of storage classes; receiving, at the service broker, a first request from a first stateful workload for a first class of storage; instructing a first storage provider having storage of the first class to provision a first volume; responding to the first request with an identification of the first volume to allow the first stateful workload to persist data on the first volume; instructing the first storage provider to generate first snapshots of the first volume according to a first data protection policy that is associated with the first storage class; and conducting backups of the first snapshots to the backup storage server coupled to the first storage provider according to the first data protection policy.

In another specific embodiment, there is a computer program product, comprising a non-transitory computer-readable medium having a computer-readable program code embodied therein, the computer-readable program code adapted to be executed by one or more processors to implement a method of providing storage and data protection as a service in a cloud native environment comprising: associating a plurality of classes of storage with a plurality of data protection policies, the plurality of storage classes being mapped to a plurality of storage providers, and the plurality of storage providers being coupled to a backup storage server; advertising, by a service broker to a plurality of stateful workloads in the cloud native environment, a service catalog listing the plurality of storage classes; receiving, at the service broker, a first request from a first stateful workload for a first class of storage; instructing a first storage provider having storage of the first class to provision a first volume; responding to the first request with an identification of the first volume to allow the first stateful workload to persist data on the first volume; instructing the first storage provider to generate first snapshots of the first volume according to a first data protection policy that is associated with the first storage class; and conducting backups of the first snapshots to the backup storage server coupled to the first storage provider according to the first data protection policy.

Figure 6:
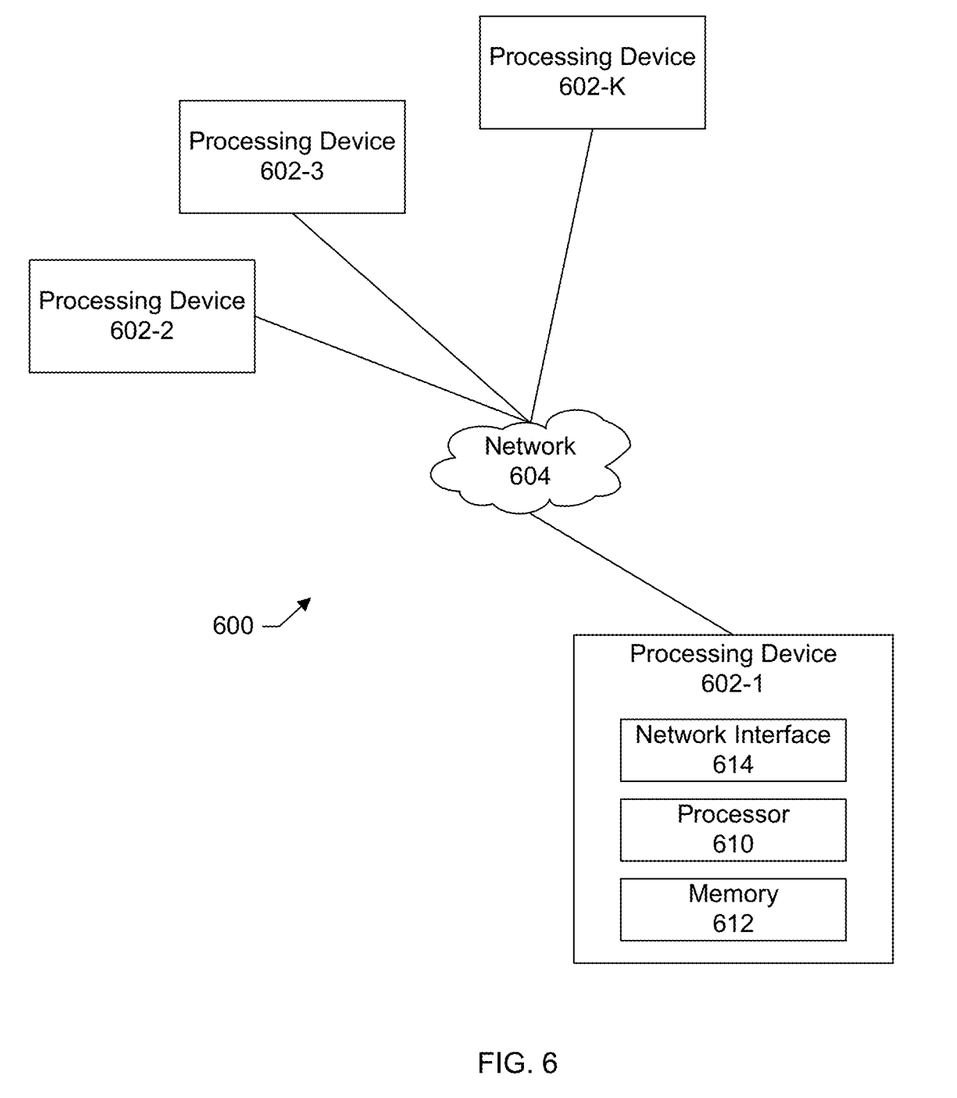
FIG. 6 shows another block diagram of a processing platform that may be utilized to implement at least a portion of an information processing system, according to one or more embodiments.

FIG. 6 shows an example of a processing platform 600. The processing platform 600 in this embodiment may include at least a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 7:
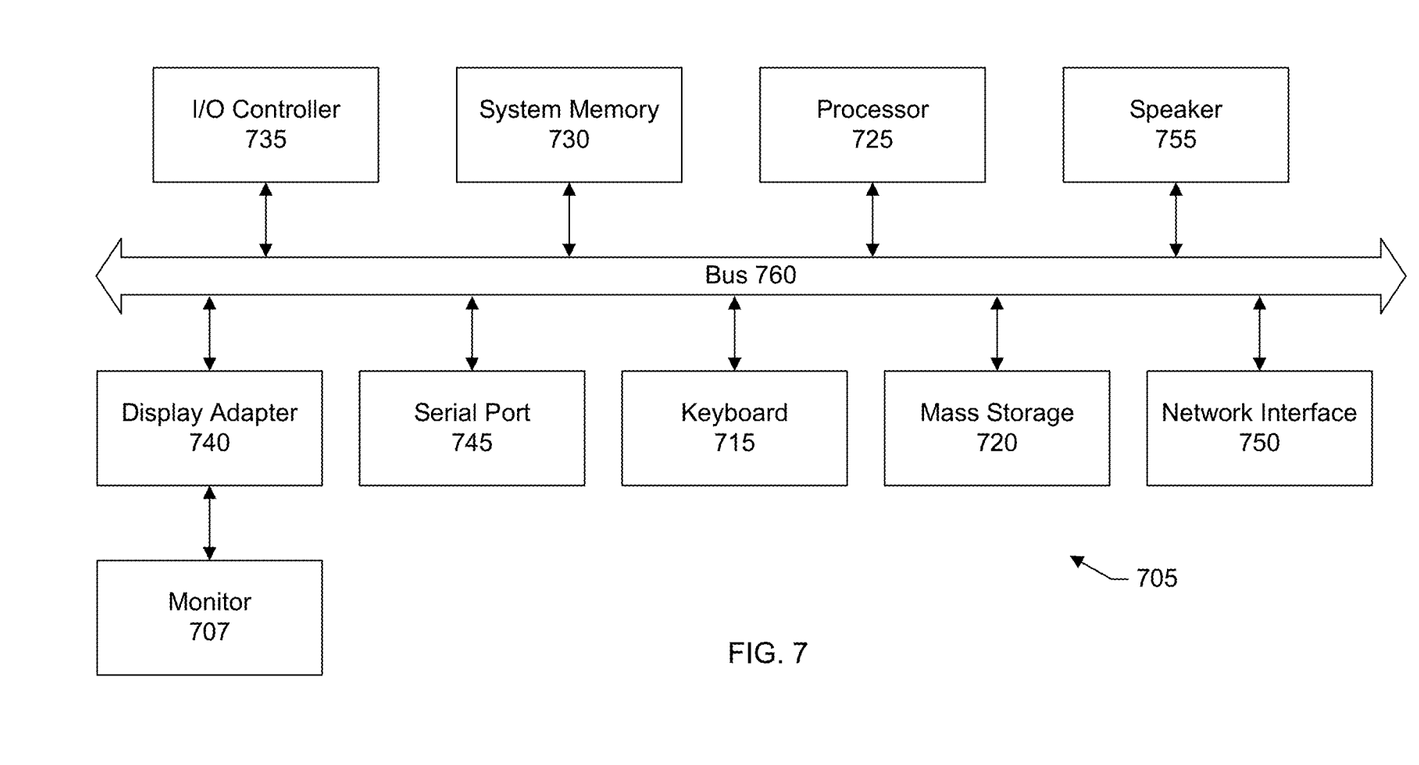
FIG. 7 shows a block diagram of a computer system suitable for use with the information processing system, according to one or more embodiments.

FIG. 7 shows a system block diagram of a computer system 705 used to execute the software of the present system described herein. The computer system includes a monitor 707, keyboard 715, and mass storage devices 720. Computer system 705 further includes subsystems such as central processor 725, system memory 730, input/output (I/O) controller 735, display adapter 740, serial or universal serial bus (USB) port 745, network interface 750, and speaker 755. The system may also be used with computer systems with additional or fewer subsystems. For example, a computer system could include more than one processor 725 (i.e., a multiprocessor system) or a system may include a cache memory.

Arrows such as 760 represent the system bus architecture of computer system 705. However, these arrows are illustrative of any interconnection scheme serving to link the subsystems. For example, speaker 755 could be connected to the other subsystems through a port or have an internal direct connection to central processor 725. The processor may include multiple processors or a multicore processor, which may permit parallel processing of information. Computer system 705 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for providing storage and data protection as a service in a cloud native environment comprising:
   associating a plurality of classes of storage with a plurality of data protection policies, the plurality of storage classes being mapped to a plurality of storage providers, and the plurality of storage providers being coupled to a backup storage server;
   advertising, by a service broker to a plurality of stateful workloads in the cloud native environment, a service catalog listing the plurality of storage classes;
   receiving, at the service broker, a first request from a first stateful workload for a first class of storage;
   instructing a first storage provider having storage of the first class to provision a first volume;
   responding to the first request with an identification of the first volume to allow the first stateful workload to persist data on the first volume;
   instructing the first storage provider to generate first snapshots of the first volume according to a first data protection policy that is associated with the first storage class; and
   conducting backups of the first snapshots to the backup storage server coupled to the first storage provider according to the first data protection policy.

2. The method of claim 1 further comprising:
   receiving, at the service broker, a second request from a second stateful workload for a second class of storage;
   instructing a second storage provider having storage of the second class to provision a second volume;
   responding to the second request with an identification of the second volume to allow the second stateful workload to persist data on the second volume;
   instructing the second storage provider to generate second snapshots of the second volume according to a second data protection policy that is associated with the second storage class; and
   not conducting backups of the second snapshots because the second data protection policy does not specify backups to the backup storage server.

3. The method of claim 1 wherein the backup storage server is separate from the plurality of storage providers.

4. The method of claim 1 wherein the first data protection policy specifies a first frequency at which the first snapshots are to be generated, and a second frequency, different from the first frequency, at which backups of the first snapshots to the backup storage server are to be conducted.

5. The method of claim 1 wherein the conducting backups further comprises:
   mounting a snapshot of the first snapshots stored at the first storage provider; and
   copying data referenced by the snapshot from the first storage provider to the backup storage server.

6. The method of claim 1 wherein each storage provider exposes a representational state transfer (REST) application programming interface (API) through which the plurality of stateful workloads issue requests for storage.

7. A system for providing storage and data protection as a service in a cloud native environment, the system comprising: a processor; and memory configured to store one or more sequences of instructions which, when executed by the processor, cause the processor to carry out the steps of:
   associating a plurality of classes of storage with a plurality of data protection policies, the plurality of storage classes being mapped to a plurality of storage providers, and the plurality of storage providers being coupled to a backup storage server;
   advertising, by a service broker to a plurality of stateful workloads in the cloud native environment, a service catalog listing the plurality of storage classes;
   receiving, at the service broker, a first request from a first stateful workload for a first class of storage;
   instructing a first storage provider having storage of the first class to provision a first volume;
   responding to the first request with an identification of the first volume to allow the first stateful workload to persist data on the first volume;
   instructing the first storage provider to generate first snapshots of the first volume according to a first data protection policy that is associated with the first storage class; and
   conducting backups of the first snapshots to the backup storage server coupled to the first storage provider according to the first data protection policy.

8. The system of claim 7 wherein the processor further carries out the steps of:
   receiving, at the service broker, a second request from a second stateful workload for a second class of storage;
   instructing a second storage provider having storage of the second class to provision a second volume;
   responding to the second request with an identification of the second volume to allow the second stateful workload to persist data on the second volume;
   instructing the second storage provider to generate second snapshots of the second volume according to a second data protection policy that is associated with the second storage class; and
   not conducting backups of the second snapshots because the second data protection policy does not specify backups to the backup storage server.

9. The system of claim 7 wherein the backup storage server is separate from the plurality of storage providers.

10. The system of claim 7 wherein the first data protection policy specifies a first frequency at which the first snapshots are to be generated, and a second frequency, different from the first frequency, at which backups of the first snapshots to the backup storage server are to be conducted.

11. The system of claim 7 wherein the conducting backups further comprises:
   mounting a snapshot of the first snapshots stored at the first storage provider; and copying data referenced by the snapshot from the first storage provider to the backup storage server.

12. The system of claim 7 wherein each storage provider exposes a representational state transfer (REST) application programming interface (API) through which the plurality of stateful workloads issue requests for storage.

13. A computer program product, comprising a non-transitory computer-readable medium having a computer-readable program code embodied therein, the computer-readable program code adapted to be executed by one or more processors to implement a method of providing storage and data protection as a service in a cloud native environment comprising:
 associating a plurality of classes of storage with a plurality of data protection policies, the plurality of storage classes being mapped to a plurality of storage providers, and the plurality of storage providers being coupled to a backup storage server;
 advertising, by a service broker to a plurality of stateful workloads in the cloud native environment, a service catalog listing the plurality of storage classes;
 receiving, at the service broker, a first request from a first stateful workload for a first class of storage;
 instructing a first storage provider having storage of the first class to provision a first volume;
 responding to the first request with an identification of the first volume to allow the first stateful workload to persist data on the first volume;
 instructing the first storage provider to generate first snapshots of the first volume according to a first data protection policy that is associated with the first storage class; and
 conducting backups of the first snapshots to the backup storage server coupled to the first storage provider according to the first data protection policy.

14. The computer program product of claim 13 wherein the method further comprises:
 receiving, at the service broker, a second request from a second stateful workload for a second class of storage;
 instructing a second storage provider having storage of the second class to provision a second volume;
 responding to the second request with an identification of the second volume to allow the second stateful workload to persist data on the second volume;
 instructing the second storage provider to generate second snapshots of the second volume according to a second data protection policy that is associated with the second storage class; and
 not conducting backups of the second snapshots because the second data protection policy does not specify backups to the backup storage server.

15. The computer program product of claim 13 wherein the backup storage server is separate from the plurality of storage providers.

16. The computer program product of claim 13 wherein the first data protection policy specifies a first frequency at which the first snapshots are to be generated, and a second frequency, different from the first frequency, at which backups of the first snapshots to the backup storage server are to be conducted.

17. The computer program product of claim 13 wherein the conducting backups further comprises:
 mounting a snapshot of the first snapshots stored at the first storage provider; and
 copying data referenced by the snapshot from the first storage provider to the backup storage server.

18. The computer program product of claim 13 wherein each storage provider exposes a representational state transfer (REST) application programming interface (API) through which the plurality of stateful workloads issue requests for storage.

* * * * *